United States Patent [19]

Adhya et al.

[11] Patent Number: 5,238,982

[45] Date of Patent: Aug. 24, 1993

[54] METHOD FOR PRODUCING POLYAMIDE FIBERS WITH REDUCED FLAMMABILITY

[75] Inventors: Atish Adhya; Robert L. Lilly, both of Asheville, N.C.

[73] Assignee: BASF Corporation, Parsippany, N.J.

[21] Appl. No.: 950,865

[22] Filed: Sep. 24, 1992

[51] Int. Cl.$^5$ .................. C08K 5/521; C08G 79/04
[52] U.S. Cl. .................. 524/145; 264/178 F; 264/211; 525/434; 528/337
[58] Field of Search .............. 524/145; 528/72, 287, 528/337; 264/178 F, 211; 525/434, 538

[56] References Cited

U.S. PATENT DOCUMENTS

| | | | |
|---|---|---|---|
| 3,134,742 | 5/1964 | Wismer et al. | 521/108 |
| 3,407,150 | 10/1968 | Wismer et al. | 521/169 |
| 3,448,087 | 6/1969 | Ballentine et al. | 528/337 |
| 3,692,867 | 9/1972 | Mayer et al. | 525/538 |
| 3,987,008 | 10/1976 | Stackman | 524/127 |
| 3,991,031 | 11/1976 | Milenius | 524/145 |
| 4,203,888 | 5/1980 | Rashbrook | 524/127 |
| 4,343,914 | 8/1982 | Lee | 528/72 |
| 4,587,324 | 5/1986 | Mikroyannidis et al. | 528/337 |
| 4,940,772 | 7/1990 | Matsumoto et al. | 524/117 |

FOREIGN PATENT DOCUMENTS

| | | |
|---|---|---|
| 48-20040 | 6/1973 | Japan . |
| 1-040521 | 2/1989 | Japan . |
| 1-168754 | 7/1989 | Japan . |
| 3-97753 | 4/1991 | Japan . |

*Primary Examiner*—Veronica P. Hoke

[57] ABSTRACT

Disclosed is a method for producing polyamide fibers with reduced flammability by melt mixing a polyamide with a phosphate ester of the general formula:

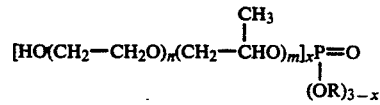

wherein
n is a number of from 1 to 10;
m is a number of from 0 to 3;
x is a number of from 0 to 3;
R is linear or branched $C_1$- to $C_{18}$- alkyl radical;
at a temperature of from about 180° to about 280° C., and melt spinning fibers.

18 Claims, No Drawings

METHOD FOR PRODUCING POLYAMIDE FIBERS WITH REDUCED FLAMMABILITY

FIELD OF THE INVENTION

The present invention is directed to a method for producing polyamide fibers with reduced flammability for the manufacture of fibers for textile articles, more specifically it is directed to the melt mixing of a phosphate ester with polyamide.

BACKGROUND OF THE INVENTION

The main approaches to reduce the flammability of polyamides are melt additives, topical finish treatments, and copolymerization with flame resistant monomers. Melt additives generally include halogenated organic compounds with high levels of bromine or chlorine. A second component when halogenated compounds are employed is antimony trioxide ($Sb_2O_3$). Other popular elements found in melt additives are phosphorus and molybdenum. Finish treatments generally require high add-on levels, and many of these lack the durability to cleaning procedures required for polyamide fabrics such as mattress ticking, apparel, upholstery and drapery.

Phosphorus compounds are widely used to reduce the flammability of thermoplastic polymers. For example U.S. Pat. Nos. 3,987,008; 4,203,888; and 4,940,772 disclose a broad variety of organic phosphor compounds in thermoplastic polyester.

U.S. Pat. No. 3,987,008 discloses a polyphosphonate with arylene and haloarylene groups. U.S. Pat. No. 4,203,888 discloses an aryl diphosphate.

One disadvantage of these phosphorus compounds is that they are inert additives which build a separate phase in the thermoplastic polymers with negative influence of the fiber properties like poor dyeability.

U.S. Pat. No. 4,940,772 describes a process for producing a flame resistant polyester by copolymerizing a polyester with an unsaturated compound and reacting this copolyester with a specific phosphorus compound.

An object of the present invention was to provide polyamide fibers with reduced flammability and simultaneous excellent physical fiber properties. Another object was to improve heat stability and dyeability of the fibers. Another object was to provide a method for producing polyamide fibers with reduced flammability.

Still another object was to provide a masterbatch of polyamide with reduced flammability for the production of polyamide fibers by melt mixing and melt spinning.

SUMMARY OF THE INVENTION

The objects of the present invention could be achieved by a method for producing polyamide fibers comprising:

(a) melt mixing a polyamide with a phosphate ester of the general formula:

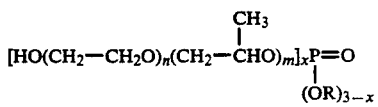

wherein
n is a number of from 1 to 10;
m is a number of from 0 to 3;
x is a number of from 0 to 3;
R is linear or branched $C_1$- to $C_{18}$- alkyl radical
at a temperature of from about 250° to about 300° C.;
and (b) melt spinning fibers.

At this temperature the phosphate ester reacts partly with amine, amide or carboxylic acid groups of the polyamide to incorporate the phosphorus compound into the polymer matrix.

DETAILED DESCRIPTION OF THE INVENTION

Polyamides are well known by the generic term "nylon" and are long chain synthetic polymers containing amide (—CO—NH—) linkages along the main polymer chain. Suitable fiber-forming or melt spinnable polyamides of interest for this invention include those which are obtained by the polymerization of a lactam or an amino acid, or those polymers formed by the condensation of a diamine and a dicarboxylic acid. Typical polyamides include nylon 6, nylon 6/6, nylon 6/9, nylon 6/10, nylon 6/12, nylon 6 T, nylon 11, nylon 12 and copolymers thereof or mixtures thereof. Polyamides can also be copolymers of nylon 6 or nylon 6/6 and a nylon salt obtained by reacting a dicarboxylic acid component such as terephthalic, isophthalic acid, adipic acid or sebacic acid with a diamine such as hexamethylene diamine, metha-xylene diamine, or 1,4-bisaminomethyl cyclohexane. Preferred are poly-epsilon-caprolactam (nylon 6) and polyhexamethylene adipamide (nylon 6/6). Most preferred is nylon 6.

The phosphate ester of the present invention has the general formula:

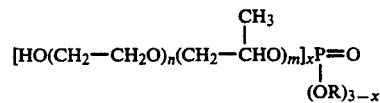

wherein
n is a number of from 1 to 10;
m is a number of from 0 to 3;
x is a number of from 0 to 3;
R is linear or branched $C_1$- to $C_{18}$- alkyl radical.

Suitable phosphate esters are for example tris (triethylene glycol) phosphate, tris (diethylene glycol) phosphate, tris (ethylene glycol) phosphate, and triethyl phosphate.

Preferred are tris (triethylene glycol) phosphate and triethyl phosphate. Most preferred is tris (triethylene glycol) phosphate.

The phosphate ester is added in an amount of from about 0.1 to about 10.0% by weight, preferably from about 0.8 to about 5.0 by weight, based on the total weight of the respective polyamide.

The phosphate ester is added in pure form or as an aqueous solution to the polyamide before processing or to the polyamide melt in an extruder at a temperature of from about 180° to about 280° C., preferably from about 200° to about 250° C.

In the case of an aqueous solution the water vapor is vented out from the twin screw extruder before the molten polyamide leaves the extruder.

The pure phosphate ester may be used or an aqueous solution which has from about 8 to about 99% by weight, preferably 60 to about 90% by weight of phosphate ester. The fibers containing from about 100 to about 1000 ppm, preferably from about 100 to about 600 ppm phosphorus, based on the fiber composition.

In a preferred embodiment of the invention this method is used to prepare a masterbatch of phosphate in polyamide in the form of chips, granules or pellets. In this case about 50 to about 60% by weight of an aqueous phosphate ester solution is used to form a polyamide masterbatch of a concentration of from about 1 to about 20% by weight phosphate ester, preferably 2 to 15% by weight phosphate ester in polyamide, based on the masterbatch.

The masterbatch chips are mixed with fiber grade polyamide chips and melt spun to the final fibers containing from about 100 to about 1000 ppm, preferably from about 100 to about 600 ppm phosphorus, based on the fiber composition.

Besides this preferred method of incorporating the phosphate ester into the polyamide, the phosphate ester may also be added before or during the polymerization or polycondensation of the particular polyamide.

In the polymerization reaction of epsilon caprolactam for example the phosphate ester is mixed with the epsilon caprolactam and from about 0.3 to about 5% by weight of water as initiator, preferably from about 0.5 to about 3% by weight, based on caprolactam. Optionally a mono- or dicarboxylic acid like benzoic acid, terepthalic acid or isophthalic acid is added in an amount of from about 0.1 to about 0.6% by weight, preferably from about 0.2 to about 0.5% by weight, based on the caprolactam. The reaction mixture is heated at a temperature of from about 180° to about 300° C., preferably from about 240° to about 290° C. for about 10 to 25 hours until a relative viscosity (1% solution in 90% formic acid at 25° C.) of from about 1.8 to about 4.0, preferably 2.0 to 3.0 is reached. The modified nylon 6 is processed into chips by extrusion or melt spun into fibers.

The amount of phosphate ester is from about 0.1 to about 10% by weight, based on the caprolactam and in case of the preparation of a masterbatch from about 1 to 20% by weight, preferably 2 to about 15% by weight, based on the caprolactam.

The technique of fiber melt spinning is well known in the art, whereby the polyamide is fed into an extruder, in case of chips or granules melted and directed via downtherm heated polymer distribution lines to the spinning head. The polymer melt was then metered by high efficiency gear pump to spin pack assembly and extruded through a spinnerette with a number of capillaries. The extruded filaments solidified, in a cross flow of chilled air. A finish based of lubrication oil and antistatic agents is then applied to the filament bundle for a proper processing performance.

In the preferred technique, the filament bundle was drawn, textured and wound-up to form bulk continuous filament (BCF). The one-step technique of BCF manufacture is known in the trade as spin-draw-texturing (SDT). Two step technique which involves spinning and a subsequent texturing is also suitable for the manufacturing BCF of this invention.

Other additives might be added to the fiber composition in effective amounts. Suitable additives are other flame retardants, UV-light stabilizers, antioxidants, pigments, dyes, antistatic agents, stain resistants, antimicrobial agents, nucleating agents and the like.

Nylon 6 filaments for the purpose of textiles manufacturing have deniers (denier=weight in grams of a single filament with a length of 9000 meters) in the range of about 3 to 75 denier/filament (dpf). A more preferred range for carpet fibers is from about 15 to 25 dpf.

The polyamide fibers show reduced flammability according to the vertical testing described in the Examples.

EXAMPLE 1

Preparation of Nylon 6 comprising tris (triethylene glycol) phosphate

Caprolactam (300 g) was mixed with tris (triethylene glycol) phosphate (TEGPa) (1.43 g) and water (9 g) in a glass vessel fitted with a stirrer. At room temperature the vessel was evacuated and filled with nitrogen three times. The mixture was heated by reluxing Dowtherm. After the caprolactam had melted the solution was stirred and refluxed for 1 H. After one hour the refluxed water was collected in another vessel and the liquid was stirred for 18 H. During this time the caprolactam had polymerized to nylon 6. The polymer was extruded and passed through cold water. The polymer properties were: RV=2.52, AEG-45.9 and CEG=51.

EXAMPLE 2

Preparation of Nylon 6 comprising tris (triethylene glycol) phosphate in the presence of a catalyst.

All the reactants of Example 1 were added in the same proportion along with benzoic acid (0.6 g). The same procedure, as described in Example 1 was used to carry out the polymerization of caprolactam. The length of polymerization time was changed to 21 H. The polymer properties were: RV=3.2, AEG-37.1 and CEG=51.

EXAMPLE 3

Preparation of a Master Batch of nylon 6 and tris (triethylene glycol) phosphate A master batch was prepared in a counter rotating twin screw extruder. The temperature in the beginning of twin screw was maintained between 220° C. and 245° C. After the injection port the temperature in the extruder was maintained at 210° C. Nylon 6 (Ultramid ® from BASF, RV=2.6) was added to the extruder through a hopper at the rate which corresponded to 100 g/min outflow of molten polymer. A solution, prepared by mixing 90:10 by weight of tris (triethylene glycol) phosphate (TEGPa) (Emery 6696-A from Quantum Chemical Corporation, Emery Div.) and water, was added through a injection port at the rate of 30 g/min. Steam, generated in the extruder, was removed by an aspirator vacuum through a vent situated just before the diehead. The hot, compounded polymer was cooled in water and chipped. The RV of the polymer was 2.45 and the phosporus concentration was 0.63%.

EXAMPLE 4 (Control)

22.5 lb. Nylon 6 (Ultramid ® B from BASF AG, Ludwigshafen, Germany, RV=2.6) were spun in a conventional manner with standard melt spinning equipment at a spinning speed of 900 m/min and drawn at a rate of 647 m/min to give an elongation of 48% and tenacity of 5.0 g/denier.

EXAMPLE 5

22.5 lb. Nylon 6 (Ultramid ® B from BASF AG, Ludwigshafen, Germany, RV=2.7) were tumble blended with 2.5 lb. of the dried master batch and spun in a conventional manner with standard melt spinning equipment at a spinning speed of 900 m/min and drawn at a rate of 647 m/min to give an elongation of 41% and tenacity of 5.0 g/denier.

VERTICAL BURN TEST PROCEDURE

Three pirns (three ends) of the drawn yarns, from Example 4 (control) and Example 5, were knit into a sock by a standard knitting machine. The socks were scoured, heat set at 375° C. and dried in a vacuum oven at 120° C. for three days. Analytical results show that the phosphorus concentration in the yarn of Example 2 was 114 ppm. The socks were cut into 8" sections and two sections from each condition were placed on top of the other. The socks were mounted on a standard frame mentioned in the NFPA 701 test method. Flammability of yarns of Example 4 and Example 5 was determined by the vertical test method described in NFPA 701, "Fire Tests for Flame Resistant Textiles and Films 1989", National Fire Protection Association, Batterymarch Park, Quincy, Mass. 02269.

The following table summarizes the individual and average burn times of the socks and the physical properties of Example 4 and Example 5 yarns.

TABLE

| Flammability Test | Example 4 [s] | Example 5 [s] |
|---|---|---|
|  | 93 | 2 |
|  | 49 | 14 |
|  | 50 | 2 |
|  | 86 | 2 |
|  | 68 | 10 |
|  | 36 | 13 |
|  | 48 | 18 |
|  | 38 | 2 |
|  |  | 5 |
|  |  | 20 |
|  |  | 16 |
|  |  | 6 |
| Average Time | 59 | 9 |
| Properties |  |  |
| DEN | 153.00 | 154.00 |
| TEN | 5.04 | 4.94 |
| ELN | 47.6 | 40.10 |
| CV | 0.62 | 0.58 |
| WPT | 34.00 | 30.00 |
| BWS | 14.00 | 13.00 |
| AEG | 30.80 | 36.30 |
| CEG | 47.30 | 51.80 |
| MES | 1.56 | 2.97 |
| RV | 2.77 | 2.77 |

DEN = Denier
TEN = Tenacity
ELN = Elongation
CV = Evenness
WPT = Water pan tangle.
BWS = Boiling water shrinkage.
AEG = Amino end groups
CEG = Carboxylic end groups
MES = Methanol solvable
RV = Relative viscosity (1% solution in 90% formic acid at 25° C.)

The average burn time of the nylon 6 control (Example 4) (59 seconds) was higher than the average burn time of the TEGPa containing sample (Example 5) (9 seconds). Most of the individual burn times are consistently lower for the TEGPa sample (a few large individual burn times were attributed to uneven distribution of phosphorus in the fiber). So TEGPa, at low concentrations, reduces the flammability of nylon 6 and does not affect the desired physical properties of nylon 6.

We claim:

1. A method for producing polyamide fibers comprising:

(a) melt mixing a polyamide with a phosphate ester of the general formula:

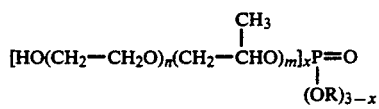

wherein
n is a number of from 1 to 10;
m is a number of from 0 to 3;
x is a number of from 0 to 3;
R is linear or branched $C_1$- to $C_{18}$- alkyl radical; at a temperature of from about 180° to about 280° C.; and (b) melt spinning fibers.

2. The method according to claim 1, wherein said phosphate ester is selected from the group consisting of tris (triethylene glycol) phosphate, tris (diethylene glycol) phosphate, and triethyl phosphate.

3. The method according to claim 1, wherein from about 0.1 to about 10% by weight, based on the polyamide of said phosphate ester is added.

4. The method according to claim 1, wherein said polyamide is selected from the group consisting of nylon 6, nylon 6/6, nylon 6/9, nylon 6/10, nylon 6/12, nylon 11, nylon 12, copolymers thereof and mixtures thereof.

5. The method according to claim 3, wherein said polyamide is nylon 6 or nylon 6/6.

6. The method according to claim 1, wherein said phosphate ester is tris (triethylene glycol).

7. The method according to claim 6, wherein said tris (triethylene glycol) phosphate is added to the polyamide in form of an aqueous solution.

8. The method according to claim 1, wherein said melt mixing is performed in a twin screw extruder.

9. The method according to claim 7, wherein an aqueous solution of tris (triethylene glycol) phosphate is added to the melt of the polyamide in said extruder and the water is vented out before extruding the polyamide.

10. The method according to claim 8, wherein said aqueous solution has a concentration of tris (triethylene glycol) phosphate of from about 8 to about 99 % by weight.

11. The method according to claim 1, wherein the temperature in step (a) is from about 200° to about 250° C.

12. A method for producing polyamide fibers comprising:

(a) forming a polyamide in the presence of a phosphate ester of the general formula:

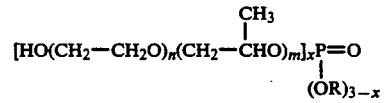

wherein
n is a number of from 1 to 10;
m is a number of from 0 to 3;
x is a number of from 0 to 3;
R is linear or branched $C_1$- to $C_{18}$- alkyl radical; and (b) melt spinning fibers.

13. A method according to claim 12, wherein said polyamide is selected from the group consisting of nylon 6, nylon 6/6, nylon 6/9, nylon 6/10, nylon 6/12, nylon 11, nylon 12, copolymers thereof and mixtures thereof.

14. A method for producing nylon 6 fibers comprising:
(a) reacting a mixture of epsilon caprolactam, water and a phosphate ester of the general formula:

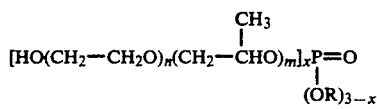

wherein
n is a number of from 1 to 10;
m is a number of from 0 to 3;
x is a number of from 0 to 3;
R is linear or branched $C_1$- to $C_{18}$- alkyl radical;
at a temperature of from about 180° to about 300° C. until intrinsic viscosity of from about 0.5 to about 0.7 is reached; and
(b) melt spinning fibers.

15. The method according to claim 14, wherein from about 0.1 to about 10% by weight, based on the caprolactam of said phosphate ester is used.

16. A polyamide fiber, obtained by the method according to claim 1.

17. The fiber according to claim 16, having a denier in the range of from about 3 to about 75 denier/filament.

18. A textile article being comprised of the polyamide fiber according to claim 1.

* * * * *